(12) United States Patent
Berteaux et al.

(10) Patent No.: US 6,776,444 B2
(45) Date of Patent: Aug. 17, 2004

(54) DASHBOARD DESIGNED TO BE MOUNTED IN AN INTERIOR OF A VEHICLE, AS WELL AS TO A VEHICLE BODY EQUIPPED WITH SUCH A DASHBOARD

(75) Inventors: Herve Berteaux, Harnes (FR); Mickael Schlachter, Harnes (FR); Jean Dauvergne, Harnes (FR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/971,366

(22) Filed: Oct. 4, 2001

(65) Prior Publication Data

US 2002/0101093 A1 Aug. 1, 2002

(30) Foreign Application Priority Data

Oct. 6, 2000 (FR) .............................................. 00 12822

(51) Int. Cl.[7] .......................... B62D 25/14; B60K 37/00
(52) U.S. Cl. .............................. 296/70; 296/208; 180/90
(58) Field of Search ........................... 296/70, 72, 208, 296/192; 180/90

(56) References Cited

U.S. PATENT DOCUMENTS

| 4,733,739 A | * | 3/1988 | Lorenz et al. | ................ 180/90 |
|---|---|---|---|---|
| 6,351,962 B1 | * | 3/2002 | Mizutani et al. | ............... 180/90 |
| 6,695,374 B1 | * | 2/2004 | Gebreselassie et al. | ........ 180/90 |
| 2002/0008398 A1 | * | 1/2002 | Yasuta et al. | .................. 296/72 |

FOREIGN PATENT DOCUMENTS

| DE | 3820644 | * | 12/1989 | ................. 296/192 |
|---|---|---|---|---|
| DE | 4134436 | * | 4/1992 | ................... 296/72 |
| JP | 63-235179 | * | 9/1988 | ................... 296/72 |
| JP | 6-166381 | * | 6/1994 | ................. 296/192 |
| JP | 2001-47889 | * | 2/2001 | |

* cited by examiner

*Primary Examiner*—D. Glenn Dayoan
*Assistant Examiner*—H. Gutman
(74) *Attorney, Agent, or Firm*—Harrison & Egbert

(57) ABSTRACT

The invention relates to a dashboard (1), designed to be mounted in the passenger compartment of a vehicle, in particular a motor vehicle, including one or more fittings (2) and at least one member (8) for supporting said fitting or fittings (2), the latter having at least a first portion (9) secured to said supporting member or members (8) and a second portion (10), or socalled free portion, designed to be emerge and/or project from the passenger compartment. According to the invention, said dashboard further includes means (12) for positioning said free portion (10) of said fitting or fittings (2) in relation to said supporting member or members (8). The invention also relates to body for a vehicle, in particular a motor vehicle, including such a dashboard.

4 Claims, 5 Drawing Sheets

DASHBOARD DESIGNED TO BE MOUNTED IN AN INTERIOR OF A VEHICLE, AS WELL AS TO A VEHICLE BODY EQUIPPED WITH SUCH A DASHBOARD

BACKGROUND OF THE INVENTION

1. Field of the Invention

The invention relates to a dashboard designed to be mounted in the interior of a vehicle, as well as to a vehicle body equipped with such a dashboard. It is designed, in particular, for motor vehicles.

2. Description of Related Art

At the present time, to mount a dashboard in the interior of a vehicle, it is known to pre-assemble all or part of the constitutive members of the dashboard in order to install it in a minimum number of operations.

It is thus known to fix various fittings previously on at least one support member, such as a cross-member.

This being said, parts of some of these fittings have to pass and/or emerge outside the passenger compartment, in particular in the engine compartment. These include, for example, conduits of the heating, ventilation and/or air conditioning apparatus, the steering shaft and/or other items.

For this purpose, the separating wall between the passenger compartment and the engine compartment is provided with openings for the passage of each of the parts of the fittings that have to pass into and/or emerge in the engine compartment, the cross-section of these openings being as small as possible in order to limit thermal and/or phonic bridge phenomena.

It is understandable that such characteristics lead to difficulties in assembling the dashboard on the vehicle as it is not only necessary to position it in order to fix it but, what is more, to fix it opposite the openings.

The object of the present invention is to provide dashboards designed to be mounted in the passenger compartment of a vehicle, as well as a vehicle body, which remedy the aforementioned drawbacks and facilitate their mounting.

Further objects and advantages of the invention will emerge in the course of the description that follows, which is given only by way of illustration and is not intended to limit it.

BRIEF SUMMARY OF THE INVENTION

The invention relates, first of all, to a dashboard, designed to be mounted in the passenger compartment of a vehicle, in particular a motor vehicle, including one or more fittings and at least one member for supporting said fitting or fittings, the latter having at least a first portion secured to said supporting member or members and a second portion, or so-called free portion, designed to emerge and/or project from the passenger compartment, characterized by the fact that it further includes means for positioning said free portion of said fitting or fittings in relation to said supporting member or members.

The invention also relates to a body for a vehicle, in particular a motor vehicle, constituted by a reinforcement, designed to define at least the passenger compartment and the engine compartment of said vehicle, said body including a separating wall between said engine compartment and said passenger compartment and a dashboard as defined earlier, positioned facing said separating wall.

BRIEF DESCRIPTION OF THE SEVERAL VIEWS OF THE DRAWINGS

The invention will be more readily understood from a study of the following description accompanied by the annexed drawings, which form an integral part thereof.

DETAILED DESCRIPTION OF THE INVENTION

Figure 1:
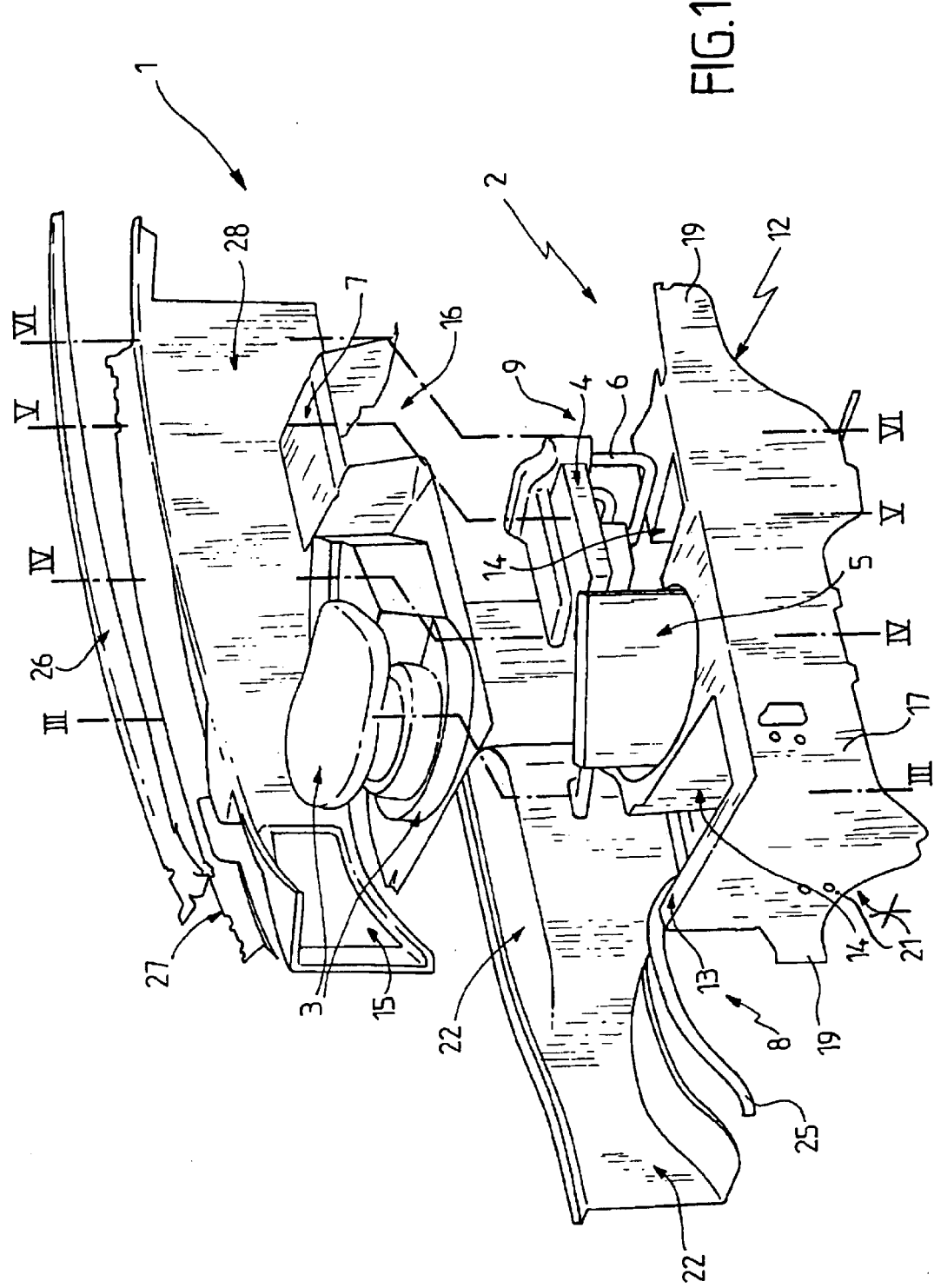
FIG. 1 is an exploded perspective view of an exemplary embodiment of the dashboard according to the invention.

The invention relates first of all to a dashboard, designed to be mounted in the passenger compartment of a vehicle, in particular a motor vehicle.

As illustrated in FIGS. 1 to 6, said dashboard 1 includes one or more fittings 2. These can be, for example, a ventilating, heating and/or air conditioning apparatus including a fan 3, a radiator 4, an evaporator 5, flow conduits 6 for a coolant fluid and/or a closing hood 7.

The dashboard according to the invention also includes at least a member 8 for supporting said fitting or fittings 2, the latter having at least a first portion 9 fixed to said supporting member or members 8 and a second portion 10, or so-called free portion, designed to emerge and/or project from the passenger compartment.

Figure 2:
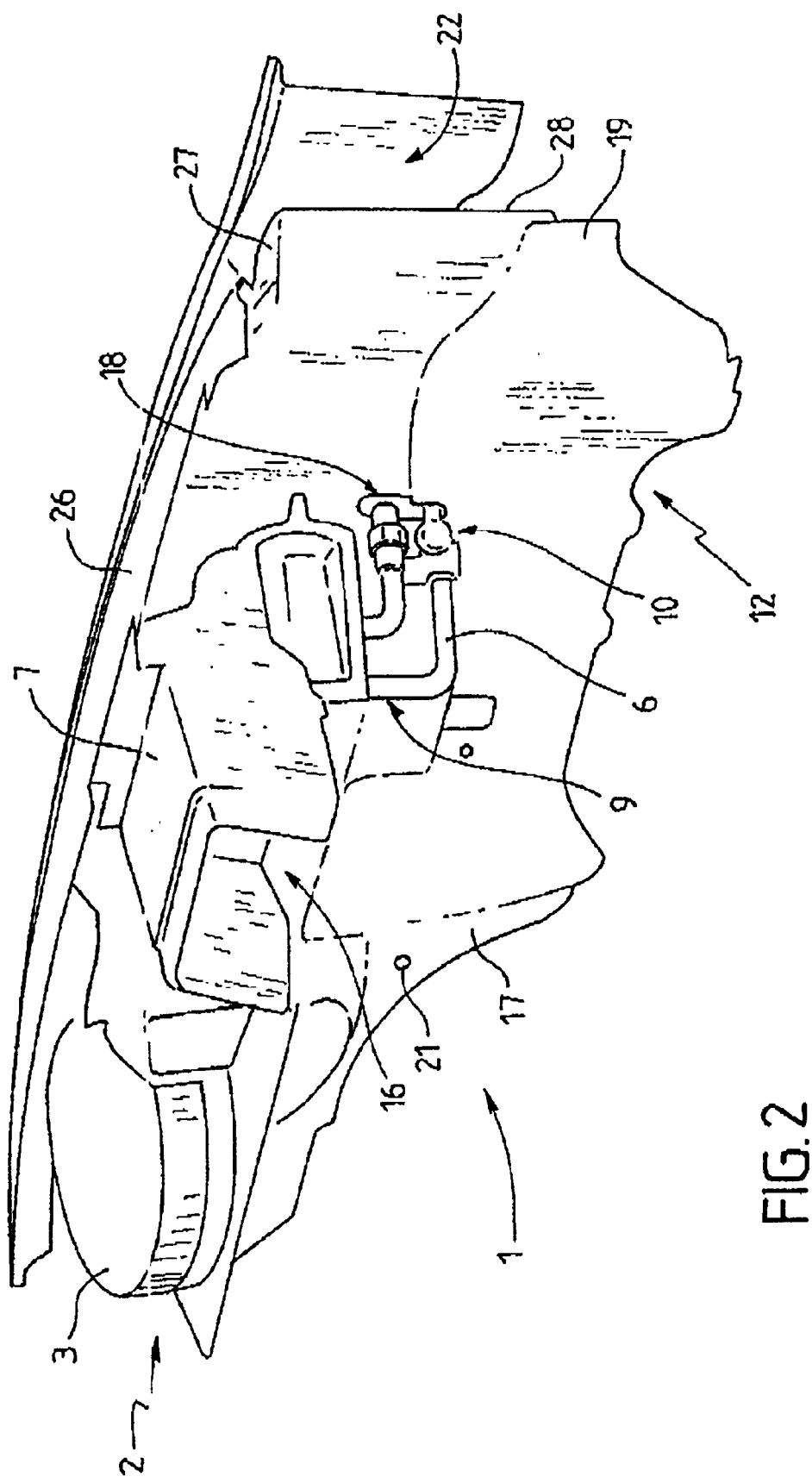
FIG. 2 is a perspective view illustrating, as assembled, the dashboard of FIG. 1, from a different angle of view.
Figure 5:
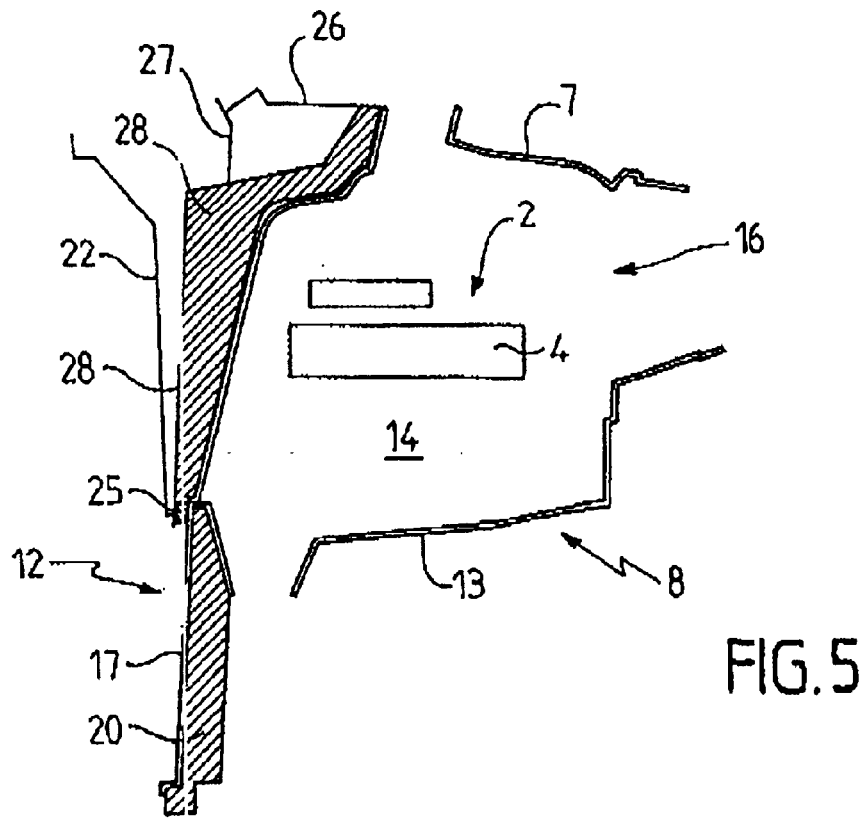
FIG. 5 is a cross-sectional view in a transverse plane, the vertical trace of which is marked V—V in FIG. 1.

As illustrated in FIGS. 2 and 5, in the heating, ventilation and/or air conditioning apparatus, said portion 9 fixed to said supporting member or members is constituted, for example, by fan 3, radiator 4, evaporator 5 and closing hood 7, while said free portion 10 is constituted, in particular, by first ends of conduits 6, their opposite ends being connected to radiator 4.

More generally speaking, said free portion 10 can be constituted by the distal end of a component of said fitting or fittings 2, extending longitudinally, said component being connected directly or indirectly to said supporting member or members 8 elsewhere, in particular in the vicinity of its proximal side.

Figure 4:
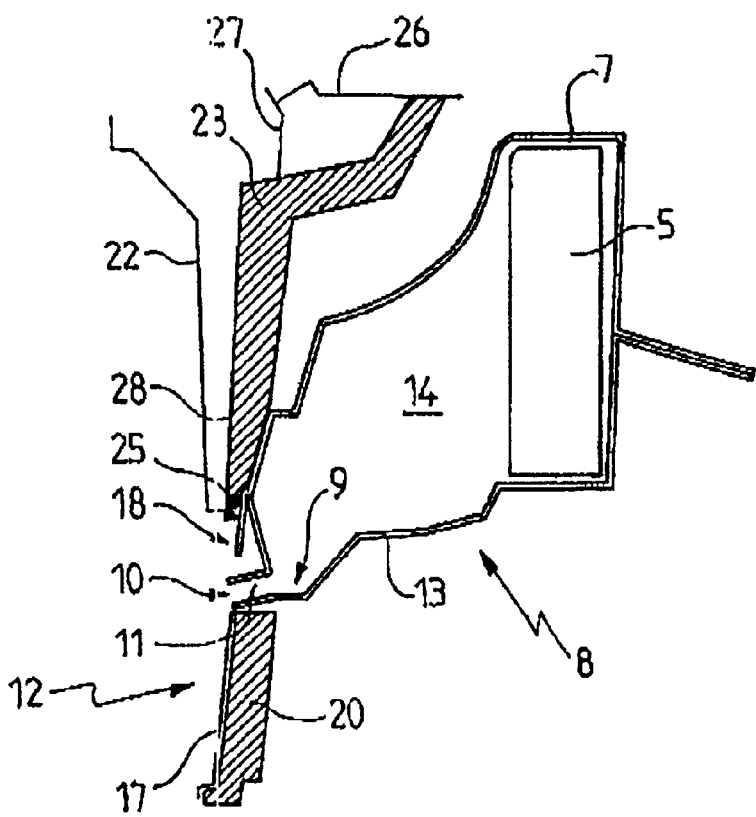
FIG. 4 is a cross-sectional view in the transverse plane, the vertical trace of which is marked IV—IV in FIG. 1.

This can be the case, in particular, as illustrated in FIG. 4, of the distal orifice of a conduit 11 for discharging the condensates of the ventilation, heating and/or air conditioning apparatus or again, it can be the case of the distal portion of the steering shaft, not shown, or the like.

According to the invention, said dashboard further includes means 12 for positioning said free portion 10 of said fitting or fittings 2 in relation to said supporting member or members 8. Said free portion or portions 10 are thus held in place in relation to the rest of the dashboard at a precise location, thus making it easier for them to exit the passenger compartment, for example in the direction of the engine compartment of the vehicle, without any additional adjustment to their positioning.

Said supporting member or members 8 are constituted, for example, by a cross-member 13, extending substantially in a so-called transverse direction, orthogonal to the longitudinal axis of the vehicle.

As illustrated, said cross-member 13 is constituted, in particular, by a, possibly defining housings 14 designed to accommodate at least partially said fitting or fittings 2, for example fan 3, radiator 4 and evaporator 6. The cross-member 13 has several planar surfaces thereon. The cross-member 13 can then be designed to be suitable for co-operating with closing hood 7 to define a closed block through which the air processed by the heating, ventilation and/or air conditioning apparatus between flows between an input orifice 15 and an output orifice 16. According to such a form of embodiment, fan 3, radiator 4 and/or evaporator 5 can be located substantially in the same plane.

According to other embodiments, cross-member 13 can be tubular and define an air flow conduit for the ventilation, heating and/or air conditioning apparatus. It can further be extended in volume and then have compartments produced in its body for all or part of said fitting or fittings 2.

Certain features of the different forms of embodiment of aforementioned cross-member 13 could, of course, further be combined with one another.

Said positioning means 12 are constituted, for example, by a skirt 17 prolonging said cross-member 13, over a portion at least of its length, by a surface designed to be transverse to said longitudinal axis, said skirt 17 being provided with first orifices 18 through which said free portions 10 are positioned.

Said skirt 17 is designed, for example, to line at least in part the wall separating the engine compartment from the passenger compartment of the vehicle. It is orientated, in particular, substantially orthogonal to the longitudinal direction of the latter.

More precisely, said skirt 17 can be made capable of mating with said separating wall. It will thus, possibly, be slightly curved.

The dimension of said skirt 17 in said transverse direction will be designed to correspond, for example, to the width of the vehicle, so as to provide it with a reinforcement to withstand lateral impact. For this purpose, it is provided, for example, with wings 19.

Said skirt 17 is clad, for instance, with a layer of sound-proofing material 20, provided on one of its faces, for example the one designed to be orientated towards the passenger compartment of the vehicle.

Said cross-member 13 and/or said skirt 17 can be provided, for example, with second orifices 21 designed to enable said dashboard to be fixed with the use of fasteners extending through the second orifices onto said vehicle.

Figure 6:
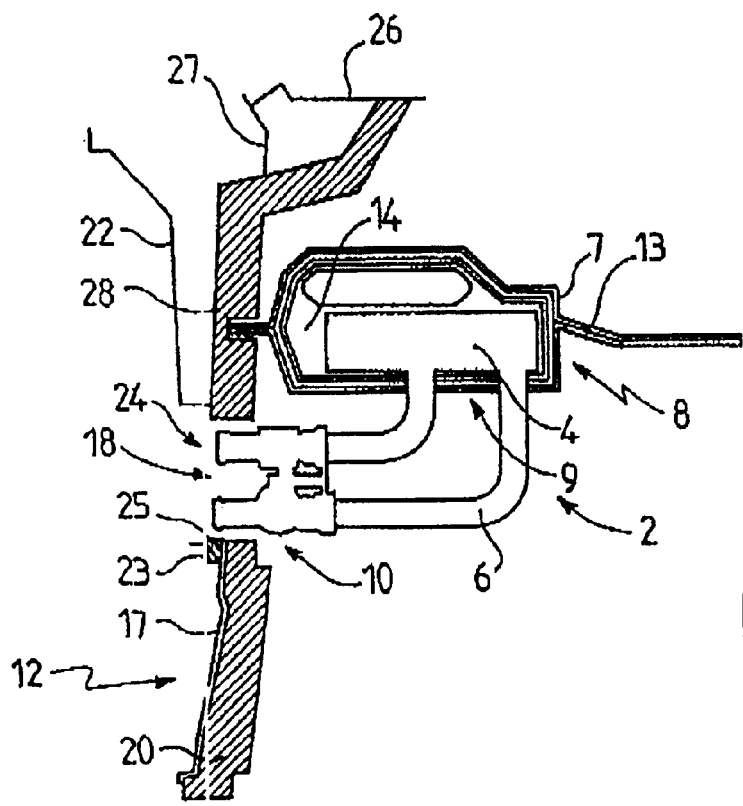
FIG. 6 is a cross-sectional view in a transverse plane, the vertical trace of which is marked VI—VI in preceding FIG. 1.

The dashboard according to the present invention can further include a collecting compartment 22 extending in said transverse direction. Said compartment 22 is prolonged by a wall 23 locally lining said skirt 17 in the area of all or part of said first orifices 18. Said wall 23 prolonging said compartment is provided with third orifices 24 corresponding to said first orifice or orifices 18, as illustrated in FIG. 6.

Figure 3:
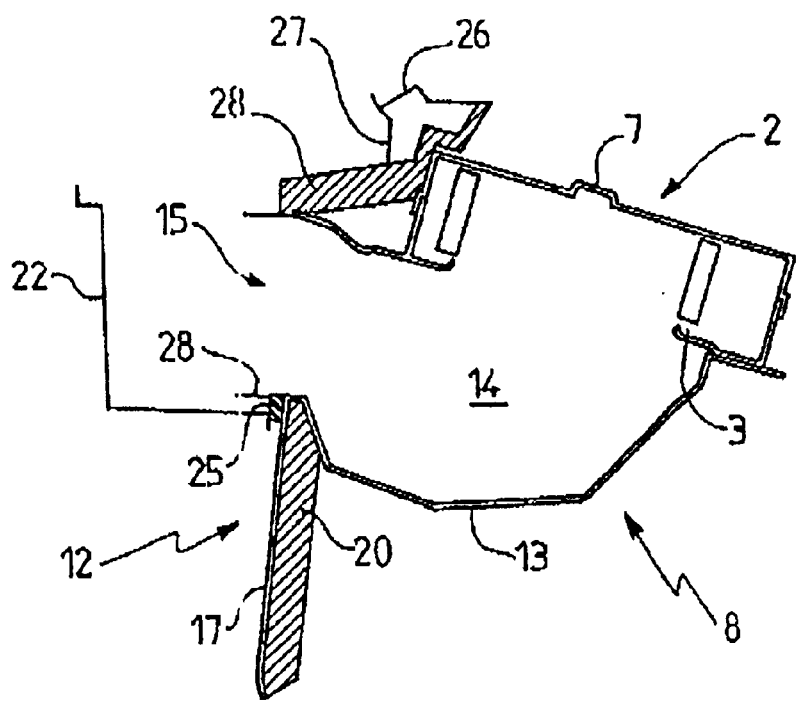
FIG. 3 is a cross-sectional view in the transverse plane, the vertical trace of which is marked III—III in FIG. 1.

The collecting compartment 22 is cooperative with a seal 25 fitted onto said skirt 17 (as shown in FIGS. 3 and 5).

Said dashboard can also include various other parts designed to extend transversely over the entire width of the vehicle, at least in the case of certain of these parts. This applies, for example, to a member 26 designed to face the lower edge of the windshield of the vehicle as well as its lining 27. This also applies, in particular, to a member 28 defining one of the lateral faces of the collecting compartment, namely the one designed to be orientated towards the passenger compartment.

Said dashboard can, of course, also include a hood and various other items, not shown in the drawings.

The invention also relates to a vehicle body.

Figure 7:
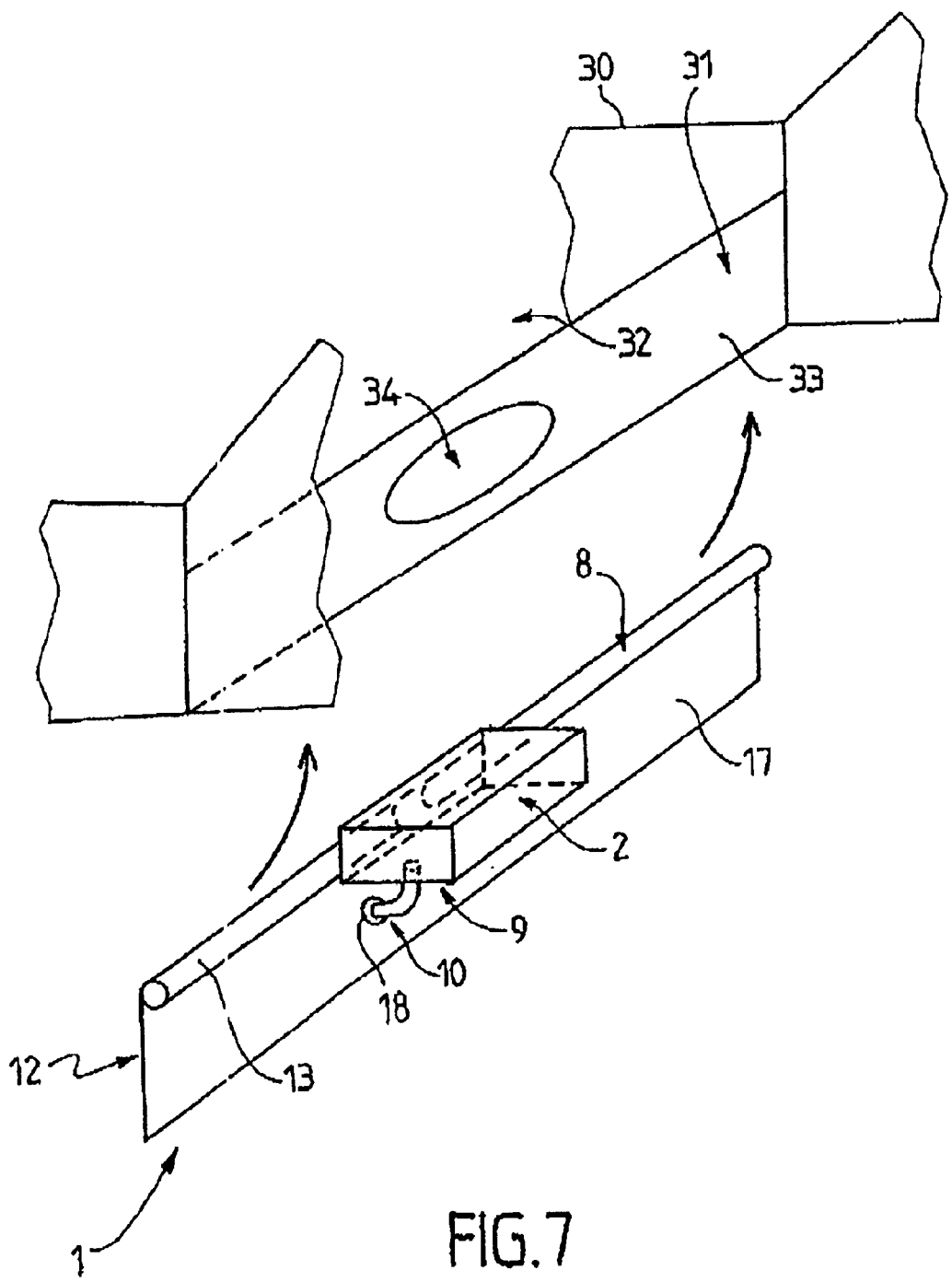
FIG. 7 is a partial, simplified diagrammatic illustration of an exemplary embodiment of the dashboard and of the vehicle body according to the invention, ready to be mounted on one another.

As illustrated in FIG. 7, said body is constituted by a frame 30, designed to define at least the passenger compartment 31 and engine compartment 32 of the vehicle.

Said body 30 includes a separating wall 33 between said engine compartment and said passenger compartment and a dashboard 1 such as the one described above.

Said separating wall 33 is provided opposite said positioning means 12 with an opening or a plurality of openings 34, for example of a larger size to allow free portion 10 of said fitting or fittings 2 to pass through or emerge without it being necessary to adjust their positions upon mounting in relation to said opening or openings 34.

The opening or openings 34 is/are thus provided, in particular, facing each of the first orifices 18, the surface area of said opening or openings 34 being far larger than the total surface area of said first orifice or orifices 18 that they face.

The body can also include a seal, not shown, between said separating wall 33 and the positioning means 12, around the opening or openings 34.

Said body can also include a seal, not shown, between said separating wall 33 and said positioning means 12, around said opening or openings 34, Said dashboard 1 is secured, for example, to said separating wall 33.

In one preferred form of embodiment, skirt 17, cross-member 13 and compartment 22 are made in one piece produced, for example, by molding. The material used can be aluminum or magnesium, or again, a plastic material, possibly strengthened by a high performance fibrous reinforcement.

In another form of embodiment, skirt 17 and compartment 22 are made of dished sheet metal and welded to one another. Cross-member 13, which is moulded or drawn, is made integral with the assembly formed by skirt 17 and compartment 22 by over-moulding a plastic material that does not confer any particular mechanical characteristics. In this form of embodiment, housings 14 of fittings 2 are produced by moulding, from the same material and by the same over-moulding operation.

Other forms of embodiment, within the grasp of one skilled in the art, could, of course, also have been contemplated without thereby departing from the scope of the invention.

We claim:

1. A dashboard apparatus for mounting onto a wall separating a passenger compartment from an engine of a motor vehicle, the apparatus comprising:
   at least one fitting;
   at least one supporting member supporting the fitting, the fitting having a first portion secured to the supporting member and a second portion, the supporting member comprising a tubular cross-member extending substantially in a single direction, said tubular cross-member suitable for circulating air therethrough for delivery to the passenger compartment; and
   a skirt directly connected to and extending from said cross-member along a portion of an entire length of said cross-member, said skirt extending transverse to a longitudinal axis of said cross-member, said skirt extendable along the wall separating the passenger compartment from the engine, said skirt having a plurality of first orifices formed therein, said second portion of the fitting extending into at least one of said plurality of first orifices, said skirt being covered with a layer of sound-proofing material.

2. The apparatus of claim 1, said skirt having a plurality of second orifices formed therein.

3. An apparatus comprising:

a motor vehicle body having an interior volume with a passenger compartment and an engine compartment therein, said body having a separating wall positioned between said engine compartment and said passenger compartment, said body having a length dimension and a width dimension; and a dashboard positioned so as to face said separating wall, said dashboard comprising:

a fitting;

a supporting member supporting said fitting, said fitting having a first portion secured to said supporting member and a second portion projecting from said supporting member, said supporting member comprising a tubular cross-member extending in a single direction transverse to a longitudinal axis of said motor vehicle body, said tubular cross-member suitable for circulating air in said passenger compartment; and a skirt directly connected to and extending from said cross-member along a portion of a length of said cross-member and extending across said width dimension of said body, said skirt extending transverse to a longitudinal axis of said cross-member, said skirt having a plurality of first orifices formed therein, said second portion of said fitting extending into at least one of said plurality of first orifices, said skirt extending along said separating wall, said skirt being covered with a sound-proofing material, said fitting comprising a plurality of items of equipment respectively extending through said plurality of first orifices.

4. The apparatus of claim 3, said separating wall having an opening through which said second portion of said fitting extends, said opening facing said skirt.

* * * * *